United States Patent [19]

Kober et al.

[11] Patent Number: 4,502,561
[45] Date of Patent: Mar. 5, 1985

[54] TRACTOR-TRAILER COMBINATION WITH A COUPLING CONNECTION

[75] Inventors: Kurt Kober, Kötz; Rudolf Wöhrle, Tschenhausen-Rieden; Robert Köhler, Kemnat, all of Fed. Rep. of Germany

[73] Assignee: Alois Kober AG, Kötz, Fed. Rep. of Germany

[21] Appl. No.: 445,952

[22] Filed: Dec. 1, 1982

[30] Foreign Application Priority Data

Dec. 15, 1981 [DE] Fed. Rep. of Germany ....... 3149700

[51] Int. Cl.³ .................... B60D 1/14; B60D 1/06; B62D 53/04
[52] U.S. Cl. ................................ 280/446 B
[58] Field of Search ........... 280/446 R, 446 A, 446 B, 280/474, 460 R, 447; 188/112

[56] References Cited

U.S. PATENT DOCUMENTS

| | | | |
|---|---|---|---|
| 3,556,558 | 1/1971 | McKee | 280/446 R |
| 3,602,529 | 8/1971 | Derr | 280/446 B |
| 3,787,068 | 1/1974 | Miller | 280/446 R |
| 3,870,128 | 3/1975 | Nicolay et al. | 188/112 R |
| 3,955,831 | 5/1976 | Whitchurch | 280/446 R |
| 4,019,754 | 4/1977 | Hinckley | 280/446 R |
| 4,106,794 | 8/1978 | Sallis | 280/446 R |
| 4,420,169 | 12/1983 | Taylor | 280/446 R |

FOREIGN PATENT DOCUMENTS

| | | | |
|---|---|---|---|
| 54882 | 6/1982 | European Pat. Off. | 280/446 R |
| 410289 | 2/1925 | Fed. Rep. of Germany | . |
| 695898 | 9/1940 | Fed. Rep. of Germany | 280/446 B |
| 2117280 | 10/1972 | Fed. Rep. of Germany | 280/446 |
| 2721914 | 11/1977 | Fed. Rep. of Germany | 280/446 B |
| 1520249 | 2/1968 | France | 280/446 B |
| 7412012 | 10/1973 | Netherlands | 280/446 B |

Primary Examiner—John A. Pekar
Attorney, Agent, or Firm—Karl F. Ross; Herbert Dubno

[57] ABSTRACT

In normal tractor-trailer combinations consisting of a tractor vehicle and a trailer vehicle such as motor caravan, the zig-zag and side-to-side movements of the trailer vehicle adversely affect the handling behavior of the tractor-trailer combination. This effect is substantially reduced by displacing the effective coupling point towards the center of gravity of the tractor vehicle without altering the distance of the trailer vehicle from the tractor vehicle. However, since this position of the effective coupling point is not accessible for structural reasons, the hitherto customary ball-headed coupling part located at the rear of the tractor vehicle is kinematically bridged by connecting two joints associated with the tractor vehicle to two joints associated with the trailer vehicle via connecting bars to form a four-joint arrangement such that the straight lines running in the longitudinal direction intersect at the desired effective coupling point.

9 Claims, 18 Drawing Figures

TRACTOR-TRAILER COMBINATION WITH A COUPLING CONNECTION

FIELD OF THE INVENTION

The invention relates to a coupling connection between a tractor vehicle and a trailer vehicle, preferably a two-wheel trailer or one having twin axles (e.g. a motor caravan, agricultural trailer or the like), consisting of a ball-headed coupling part arranged on the tractor vehicle and a coupling housing part located on the trailer vehicle and provided with a spherical concavity for receiving a ball head of the ball-headed coupling part.

BACKGROUND OF THE INVENTION

In such tractor-trailer combinations, the connecting point of the trailer vehicle to the tractor vehicle is fixed and unalterable. The ball-headed coupling part must thus project a not inconsiderable extent beyond the rear of the tractor vehicle to substantially facilitate the coupling and uncoupling of the trailer vehicle, but this causes problems as regards the handling properties of the tractor-trailer combination. Not only the trailer vehicle load, but also the dynamic forces arising during movement, act at a point on the tractor vehicle which is a considerable distance from the center of gravity and is far behind the rear axle of the tractor vehicle.

Although the handling properties of such tractor-trailer combinations have been substantially improved by altering the constructions of the trailer vehicle axles, for example by designing them as tilted shaft axles, the problem of the zig-zag and side-to-side movement of the trailer vehicle, particularly when travelling at high speed in the forward direction, has not hitherto been satisfactorily solved, and certainly not in an optimum manner. No surprising solution to this problem was expected because developments over the last few decades have always involved joining the trailer vehicle to a coupling point disposed outside the outer perimeter of the tractor vehicle. The zig-zag and side-to-side movement of the trailer vehicle (by this is meant an oscillating yawing movement of the trailer about a vertical axis), which often occurs when travelling over uneven surfaces and particularly at high speeds, acts on the tractor vehicle via the one coupling point and causes it to execute a counter-movement, which although absorbed and damped by the four wheels and two axles of the tractor vehicle, nevertheless adversely affects the handling behavior of the tractor-trailer combination.

OBJECT OF THE INVENTION

The general object of the invention is substantially to reduce the effect of this zig-zag and side-to-side movement of the trailer vehicle on the tractor vehicle.

SUMMARY OF THE INVENTION

From West German Patent Specification No. 410 289 it is known to form a connection between a tractor vehicle and a two-wheel trailer in such a way that the pitching motion of the trailer can be counteracted. The solution to this known problem can only be achieved in a complicated manner by mounting the longitudinal supports of the trailer frame on a rotary table situated above the rear axle of the tractor vehicle and also connecting the frame of the tractor vehicle to the frame of the trailer via spring-compensated connecting bars arranged parallel to one another. These connecting bars act as buffer rods that are intended to exert stabilizing forces when the trailer begins to oscillate.

This solution was devised in 1924 when the present conventional coupling connectings between tractor vehicles and two-wheel trailers had not yet been developed. The basic drawback of this proposal is that the trailer cannot be decoupled from the tractor vehicle. Consequently, the said proposal was unable to provide any incentive to stabilize or avoid the side-to-side movement in the case of tractor-trailer combinations for day-to-day use.

Starting from the conventional coupling connection, the essence of the invention is that the effective coupling point of the coupling connection is displaced towards the center of gravity of the tractor vehicle by means of a mechanism bridging the coupling means of the conventional trailer coupling.

The solution according to the invention is based on the concept that there is a relationship between the position of the coupling point and its distance from the center of gravity of the trailer vehicle, which basically affects the occurrence of side-to-side movements of the trailer vehicle. Since the center of gravity of the trailer vehicle cannot be displaced arbitrarily, the invention seeks to displace the effective coupling connection point between the tractor vehicle and the trailer vehicle without making it impossible to couple up the trailer vehicle.

The actual gist of the invention is thus to couple the trailer vehicle to the usual point on the tractor vehicle, but to make this coupling point ineffective and displace it towards the center of gravity of the tractor vehicle, at a point which will be expressed within the context of the invention by the term "effective coupling point".

This desired effect is accomplished by kinematic bridging arrangements, which may differ in their individual design.

A first embodiment of the invention proposes that a towing arm mounted in a swivellable manner at the desired effective coupling point of the tractor vehicle carries a ball-headed coupling part at its free end projecting beyond the outer perimeter of the tractor vehicle, and that the trailer vehicle drawbar containing the coupling housing part cooperable with the ball-headed coupling part is connected to the towing arm via members, for example bearing springs, preventing both parts from buckling.

In this connection, it has proved expedient if the towing arm is connected in an articulated manner to a laterally engaging shock absorber.

In another, preferred embodiment of the invention it is proposed that the actual coupling point formed by the usual ball-headed coupling part is bridged by a four-joint arrangement formed by two connecting bars, in which the joints associated with the tractor vehicle are closer together than those associated with the trailer vehicle. In this regard, it is recommended that if the joints associated with the tractor vehicle are formed as individual ball-headed couplings, the housings of these individual ball-headed couplings be supported by the connecting bars.

With this variant of the invention, two stationary joints are thus provided on the tractor vehicle and the other two joints are provided on the trailer vehicle. Instead of there being a stationary forked drawbar, each joint of the tractor vehicle is connected to the opposite joint of the trailer vehicle by means of a connecting bar, resulting in a trapezium-shaped four-joint arrangement. As a result of the different distances between the joints of the individual pairs of joints, an effective (imaginary) coupling point is produced at the point of intersection of the axes passing through the connecting bars and their joints; this coupling point lies beneath the superstructure of the tractor vehicle and as close as possible to its centre of gravity or rear axle. The tractive forces and compressive forces resulting from the trailer vehicle and tractor vehicle thus act on the tractor vehicle at a point located substantially more favorably than in the case of conventional tractor-trailer combinations. However, the coupling connection according to the invention can be released without any difficulty, as in the case of conventional tractor-trailer combinations, since the connecting bars can be released from their associated joints.

Secondly, the four-joint arrangement according to the invention means that certain specific movements of the tractor vehicle, which would normally have an adverse effect on the handling behaviour of the tractor-trailer combination, will have less effect on the handling behaviour of the trailer vehicle. On cursory examination, it would in fact be expected that the tractor-trailer combination according to the invention would present problems in curvilinear motion. However, it has been found that in practice that the four-joint arrangement according to the invention does not have any adverse effect on the behaviour of the tractor-trailer combination in curvilinear motion.

Multi-joint connections between tractor vehicles and trailor vehicles are known per se. However, they have been used to solve other tasks and, in provisionally published West German Patent Specification No. 2 242 886 for example, the multi-joint arrangement is intended to help produce a stable handling in reverse motion. In West German Utility Model No. 8 005 600, the multi-joint arrangement is in intended to achieve an increase in the loading volume of the superstructure of the trailer.

In none of the prior embodiments, however, is the effective coupling point displaced from its position in the customary tractor-trailer combination to a position closer to the centre of gravity of the tractor vehicle, without the necessity of having to arrange the coupling parts at the site of the effective coupling point.

According to one modification of the invention, the joints of the pair of joints associated with the tractor vehicle are formed as individual ball-headed couplings that are connected to the joints located on the trailer vehicle via connecting bars with corresponding coupling housings. In contrast to conventional tractor-trailer combinations, in this simple embodiment the connecting bars have to be coupled at two places (in contrast to the hitherto customary one place). If such connecting bars are rectilinear and form an acute angle with one another, the angle of steering lock of the tractor vehicle with respect to the trailer vehicle is not sufficient. In order to overcome this problem, the invention provides that the connecting bars are outwardly bowed in the form of outwardly projecting angle levers or appropriately curved levers (crescent-shaped levers). In this connection, it is recommended that where the connecting bars are provided in the form of angle levers each having two unequal arms, the longer arms of the two angle levers should extend from the joints located on the tractor vehicle and should be longer than the distance between these joints.

Using such an arrangement, it is easily possible to satisfy the given requirements concerning the necessary angle of steering lock and to design the coupling connection in such a way that it is reliable even under severe operating conditions.

As a result of the splitting, in accordance with the invention, of the previously known single coupling point into four joints, it must of course be ensured that the tractor vehicle and trailer vehicle can execute in an unimpeded manner the usual relative movements. The degrees of freedom for curvilinear motion, uphill and downhill motion, as well as relative rolling movements about the longitudinal axis of the tractor-trailer combination must therefore be guaranteed. The necessary degrees of freedom for curvilinear and uphill and downhill motion are already achieved if the joints of at least one of the pairs of joints are formed as ball-headed joints. In order to obtain the degree of freedom for relative rolling movement about the longitudinal axis of the tractor-trailer combination, the invention provides that the joints associated with the trailer vehicle are combined in a framework mounted along the longitudinal axis of the trailer vehicle within the frame or chassis of the trailer vehicle. This mounting may also be used to couple up the customary overrunning brake to the frame joined to the trailer vehicle so that relative movement in the longitudinal axial direction and rotational movement are possible. In this regard it is recommended to shift the drawbar which, in conventional tractor trailer combinations can be moved longitudinally in the region of the coupling housing.

The joints associated with the tractor vehicle may on the contrary be connected in a stationary manner to the latter.

In this connection, it is recommended that the joints associated with the tractor vehicle be connected in a stationary manner via a bridge to the ball-headed coupling part of the tractor vehicle. This involves combining a tractor-trailer combination equipped in the usual manner with the arrangement according to the invention without carrying out any structural alterations to the tractor vehicle. With the aid of a suitable clamping device, it is possible to secure the joints associated with the tractor vehicle to the bridge carrying the ball head of the ball-headed coupling part and thus achieve a fixed stationary position of the joints for joining up the connecting bars.

However, a particularly advantageous feature of the invention is that all joints are combined in a structural unit associated with the trailer vehicle, which unit contains a conventional coupling housing part for connecting the structural unit to a ball-headed coupling part associated with the tractor vehicle and two bridges joined via the connecting bars, of which the bridge associated with the tractor vehicle and accommodating the joints is supported with at least one degree of freedom with respect to the tractor vehicle or its coupling part, and the bridge associated with the trailer vehicle and accommodating the joints is mounted in a swivellable and optionally axially displacable manner, in the form of the trailer vehicle or its chassis, around an axis extending in the direction of movement. Further advantageous features are disclosed in appended claims 13 to 17.

Such a modification of the subject matter of the invention enables the trailer vehicle to be coupled in the usual manner to the ball head of the tractor vehicle using a single ball-headed coupling. This joint absorbs both tractive and compressive forces, as in a normal tractor-trailer combination. The zig-zag and side-to-side movements or other relative movements of the tractor vehicle and trailer vehicle are, however, transmitted via the four other joints and connecting bars located on the bridge of the trailer vehicle. The objective of the invention is thus achieved, but the bridge associated with the tractor vehicle is supported relative to stationary structural parts of said tractor vehicle, with the result that the desired displacement of the effective coupling point is achieved via these supporting arrangements. Such supporting arrangements are intended to cooperate when the coupling connection is made. The invention is thus concerned with mutually supporting guidance systems that slide within one another and have the objective of allowing the two joints associated with the tractor vehicle to work.

By such means, existing trailer vehicles can be re-equipped at low cost without having to alter the ball-headed coupling part of the tractor vehicle. It is merely necessary to connect up the appropriate supporting elements.

The hereinbefore mentioned principles can also be realised constructively in another way by arranging, in accordance with the invention, the two joints associated with the tractor vehicle on a carrier plate accommodating the conventional ball-headed coupling part, which plate is supported in an articulated manner relative to the tractor vehicle by at least one side arm, the joint axis running horizontally and transversely to the tractor-trailer combination axis through the centre of the ball head. This solution starts from the basic idea of mounting the drawbar of the trailer vehicle on the tractor vehicle in the usual way using a ball-headed coupling and then supporting the coupling-containing support plate with respect to the tractor vehicle so as to ensure an articulated movement capability along the horizontal axis passing through the ball coupling.

There are numerous possibilities for creating this articulated support, for example forming the side arm joint through the bearing of a lever which is rigidly clamped to a towing ring of the tractor vehicle. It is also advantageous if the side arm joint is formed by a ball-headed coupling and is arranged on a shoulder portion rigidly connected to the tractor vehicle or its frame. These and other measures require of course the adoption of appropriate structural measures on the tractor vehicle.

A coupling connection according to the invention can, however, also be provided without having to make any structural alterations to the tractor vehicle. In this case, it is recommended for example to mount the individual side arm in the support plate in a rotatable manner about the joint axis which passes horizontally through the ball-head, and connect the side arm to clamping means rigidly supported on the tractor vehicle. Such clamping means may for example be clamping levers swivellably mounted about vertical axes, which are supported at their free ends on the bumper of the tractor vehicle or its securing means and are locked with respect to the side arm by stop means. In this connection, it is recommended to allow the clamping lever to engage by means of a soft cushion on the outside of the bumper. The clamping lever may for example be locked by means of a ratchet-like joint along the vertical axis. The side arm and/or the clamping lever may, however, also be provided with a spindle whose spindle plate is supported by means of a soft cushion on the bumper of the tractor vehicle.

In all cases, care should be taken to ensure that the support plate does not execute any rotational movement about the longitudinal axis of the tractor vehicle and cannot prevent rotational movement around the horizontal axis.

BRIEF DESCRIPTION OF THE DRAWING

Embodiments of the invention are diagrammatically illustrated, by way of example, with reference to the accompanying drawings, in which.

SPECIFIC DESCRIPTION

Figure 1:
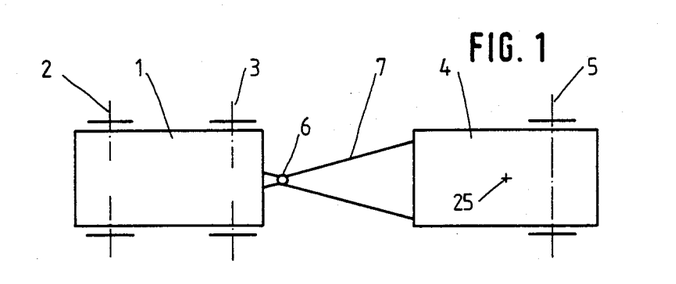
FIG. 1 is a diagrammatic plan view of a tractor vehicle and trailer vehicle with a conventional coupling as a basis for comparison.

FIG. 1 illustrates the conventional arrangement of a tractor-trailer combination, wherein a tractor vehicle 1 has a front axle 2 and a rear axle 3, and a trailer vehicle 4 has a trailer axle 5 which may also be a twin axle. A drawbar 7 of the trailer vehicle 4 is mounted on the tractor vehicle 1 by means of a ball-headed coupling part 6. This part 6 projects beyond the rear end of the tractor vehicle 1 and is thus located a considerable distance from the center of gravity of the tractor vehicle 1. A zig-zag and side-to-side movement about the vertical axis passing through the center of gravity 25 of the trailer vehicle 4 consequently results in a rotational movement which acts on the tractor vehicle 1 via the part 6 and produces a reaction.

Figure 2:
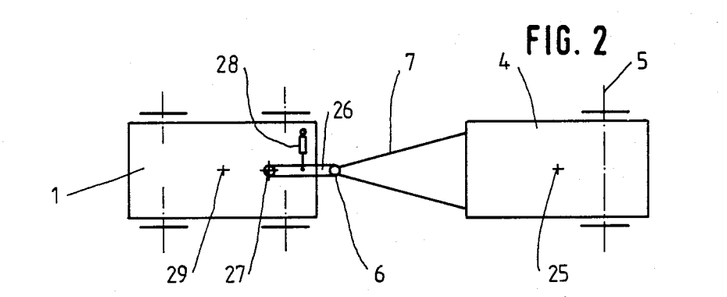
FIG. 2 is a plan view of a tractor vehicle and a trailer vehicle with a towing arm mounted on the tractor vehicle.

In a first embodiment of the invention, according to FIG. 2, the actual coupling part 6 is arranged on a towing arm 26 standing free beyond the outer perimeter of the tractor vehicle 1, and this towing arm 26 has a swivel bearing 27 close to the center of gravity 29 of the tractor vehicle 1. The towing arm 26 is supported against lateral turning movements by means of a shock absorber 28. Spring elements (not shown) are also incorporated between the towing arm 26 and drawbar 7, which are intended to prevent a premature buckling of the drawbar 7 relative to the towing arm 26. It can be imagined that the drawbar 7 and towing arm 26 have flanges arranged spaced apart and parallel to one another, between which compressible springs acting outside the longitudinal axis of the tractor-trailer combination are arranged.

With such an arrangement, the effective coupling point is moved from the normal position of part 6 to the swivel position 27 of the towing arm 26, i.e. closer to the centre of gravity 29 of the tractor vehicle 1, as a result of which the zig-zag and side-to-side movement of the trailer vehicle 4 is prevented.

Figure 3:
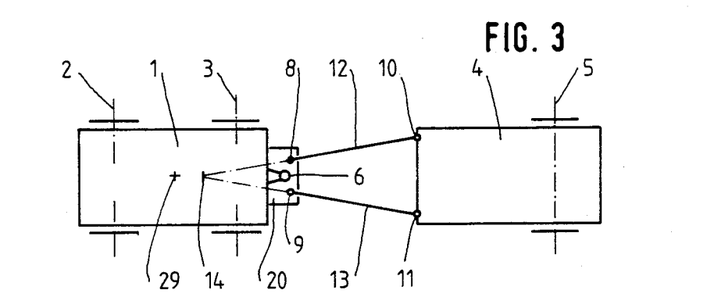
FIG. 3 is a plan view of a tractor vehicle and a trailer vehicle with a four-joint coupling connection.

In another embodiment of the invention, according to FIG. 3, the joint 6 (c.f. FIG. 1) is split up into four joints 8, 9, 10 and 11, of which the joints 8 and 9 form one pair of the joints 10 and 11 form the other pair. The pair of joints and 8 and 9 is connected to the tractor vehicle 1 via the bridge 20. The other pair of joints 10 and 11 is arranged directly, or via a bridge, on the trailer vehicle 4. The distance between the joints 8 and 9 is less than the distance between the joints 10 and 11. The joints 8 and 10 are joined to one another by a connecting bar 12 and the joints 9 and 11 are joined to one another by a connecting bar 13. A four-joint arrangement is thus formed by the connecting bars 12 and 13 and by joints 8 to 11. The point of intersection 14 of the extensions of the connecting bars 12 and 13 is the effective coupling point in this embodiment. It can be seen by comparing FIGS. 1 and 3 that the effective coupling part 14 according to FIG. 3 is substantially closer to the centre of gravity 29 of the tractor vehicle 1 than in the example shown in FIG. 1. Consequently, the dynamic forces resulting from the movement of the trailer vehicle 4 are absorbed substantially more readily by the tractor vehicle 1 with the arrangement according to FIG. 3 than with a conventional arrangement according to FIG. 1. On the other hand, a deflection movement is possible on account of the four-joint arrangement 8 to 13, through the handling behaviour of the tractor vehicle is not directly transmitted to the trailer vehicle 4 even under unfavorable ground conditions and high speeds, since a not insubstantial proportion of this influence is absorbed by the articulated deflection movement of the connecting bars 12 and 13.

It must of course be established that an arrangement according to FIG. 3 has a still insufficient degree of turning lock of the tractor vehicle 1 relative to the trailer vehicle 4, especially if the distance between the tractor vehicle 1 and the trailer vehicle 4 is kept as small as possible.

Figure 4:
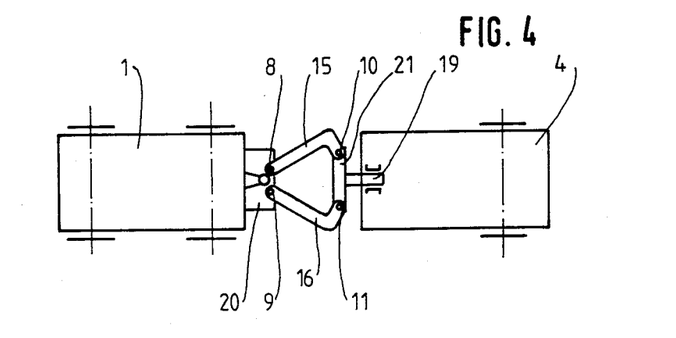
FIG. 4 is a plan view of an arrangement according to FIG. 3, in which connecting bars are formed as angle levers.

In order to establish this desired high degree of turning lock to be achieved, in the example illustrated in FIG. 4, the connecting bars (12 and 13 in FIG. 3) are formed as angle levers 15 and 16, the arms of the angle levers 15 and 16 connected to the joints 8 and 9 being larger than the arms connected to the joints 10 and 11. Also, there is the structural requirement that the longer arms of the angle levers 15 and 16 are of greater length than the distance between the joints 8 and 9. This ensures that when the tractor vehicle 1 turns relative to the trailer vehicle 4, the deflection movement of the angle levers 15 and 16 is not hindered by the structural arrangement of the joints 8 and 9.

The arrangement according to FIG. 4 provides the necessary degrees of freedom between the tractor vehicle 1 and the trailer vehicle 4 for curvilinear motion and uphill and downhill motion, assuming that the joints 8 and 9 are ball-headed joints. The joints 10 and 11 should on the other hand be designed as bearings rotatable about vertical axes, in order to be able to transmit the trailer vehicle load from the trailer vehicle drawbar to the tractor vehicle 1.

However, as a result of the four-joint arrangement 8 to 11, there is no degree of freedom for allowing the trailer vehicle 4 and tractor vehicle 1 to execute relative rolling movement about the longitudinal axis of the tractor-trailer combination. For this reason, in the embodiment illustrated in FIG. 4, the bridge 21 for the joints 10 and 11 can rotate about the longitudinal axis of the trailer vehicle 4, which is shown symbolically by the swivel axis 19. The trailer vehicle 4 can thus rotate relative to the tractor vehicle 1 about this swivel axis 19 as a result of an uneven surface without the joints 8 to 11 being loaded.

In this connection, reference may be made to the arrangement of the overrunning brake conventional in such systems. In the arrangement according to FIG. 1, a tow bar that can move relative to the drawbar 7 in the longitudinal axial direction is provided in the region of the coupling 6, the movement of the tow bar relative to the movement of the trailer vehicle 4 indicating that the overrunning brake is working. This relative movement can be displaced in the embodiment of FIG. 4 to the region of the swivel axis 19, with the result that it is directly possible to arrange an overrunning brake closer to the trailer vehicle without the brake being adversely affected by the four-joint arrangement 8 to 13.

Figure 5:
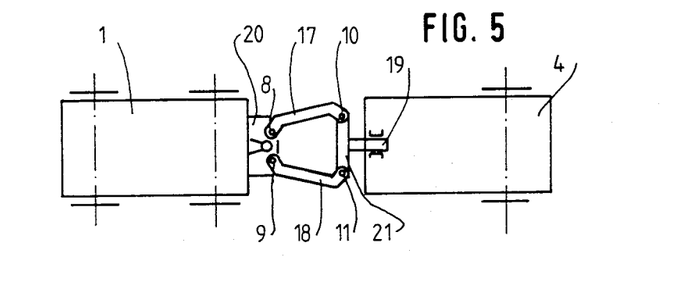
FIG. 5 is a plan view of an arrangement according to FIG. 3, in which connecting bars are formed as crescent-shaped levers.

In the embodiment illustrated in FIG. 5, so-called crescent-shaped levers 17 and 18 are provided in place of the angle levers 15 and 16 according to FIG. 4, wherein in each case the distance between the joints 8 and 9 is less than that between the joints 10 and 11. It can be seen that the arrangement of the connecting bars 12 and 13 (c.f. FIG. 3) can be varied in numerous ways.

Figure 6:
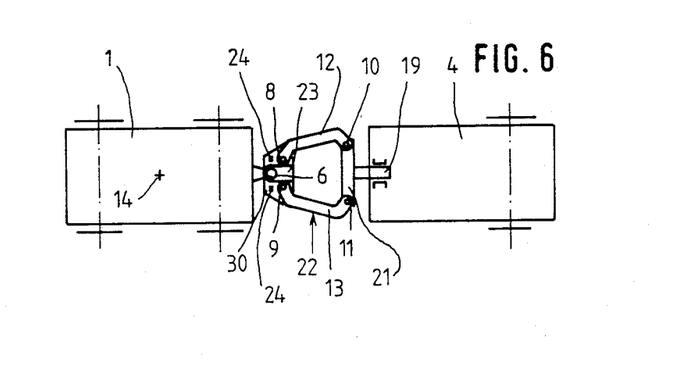
FIG. 6 is a plan view of an arrangement according to FIG. 3, in which all joint points are combined in a bridge connected to the trailer vehicle.

The embodiment illustrated to FIG. 6 shows diagrammatically that all four joints 8 to 11 can be arranged in a common structural group 22 that is connected to the trailer 4 in a relatively rotatable manner, in particular via the pivot axis 19. A coupling housing 23 is arranged in this structural group 22 which corresponds to that of the customary tractor-trailer combinations and can be connected to the ball-headed coupling part 6 (c.f. FIG. 1) of the conventionally equipped tractor vehicle. However, in order for the effect of the invention to be realised, this structural group 22 must be designed according to the invention. It has a bridge 21 associated with the trailer vehicle 4, as well as a bridge 30 associated with the tractor vehicle 1 and these bridges are joined to another via the joints 8 to 11 and connecting bars 12 and 13, the joints 8 to 11 being formed as bearings rotatable about vertical axes in order to accommodate the load of the trailer vehicle 4.

The bridge 30 is guided relative to the tractor vehicle 1 by means of supports 24, with the result that it is not the effects described with reference to FIG. 1, but those described with reference to FIG. 3 and the following figures which occur, since of course the joints 8 and 9 are connected to the trailer vehicle 4 via connecting bars 12 and 13 and the bridge 21. These supports 24, which are illustrated in FIGS. 7 to 10, are intended to enforce the effects via the joints 8 and 10 and 9 and 11, as has been generally described with reference to FIGS. 3 and 4. In this way, the usual coupling joint 6 is bridged, which of course takes up the tractive and compressive forces in forward movements. Horizontal buckling of the trailer vehicle relative to the tractor vehicle is however prevented by means of the supports 24, with the result that in this case too the effective coupling point 14 is displaced in the direction of the centre of gravity 29 of the tractor vehicle 1.

Such an arrangement, as illustrated in FIG. 6, provides the possibility of equipping a trailer vehicle 4 with a coupling connection according to the invention and connecting it to a tractor vehicle 1 having a conventional ball-headed coupling part, and all that needs to be additionally installed are the supports 24.

Figure 7:
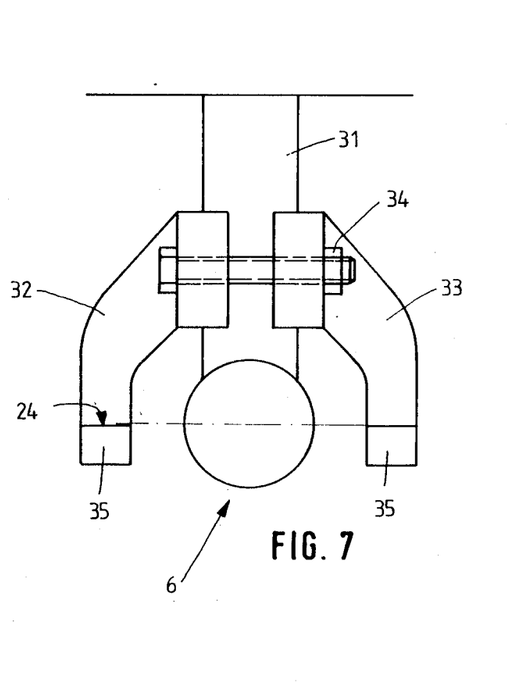
FIGS. 7 and 8 are plan and side views, respectively, of a supporting device connected to the tractor vehicle.
Figure 8:
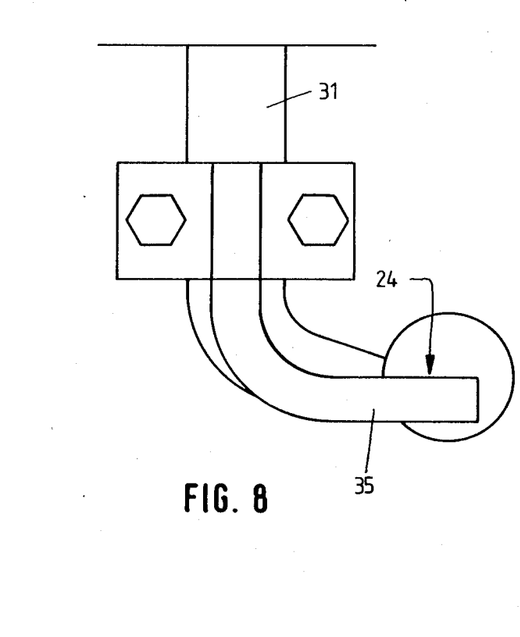

According to the embodiment illustrated in FIGS. 7 and 8, two clamping jaws 32 and 33 are secured by bolts to the coupling neck 31 of a normal ball-head coupling part 6, the jaws transforming into a vertical shoulder portion 35 with a bearing surface forming the support 24, whose vertical plane intersects the mid-point of the ball head of the ball-headed coupling part 6.

Figures 9, 10:
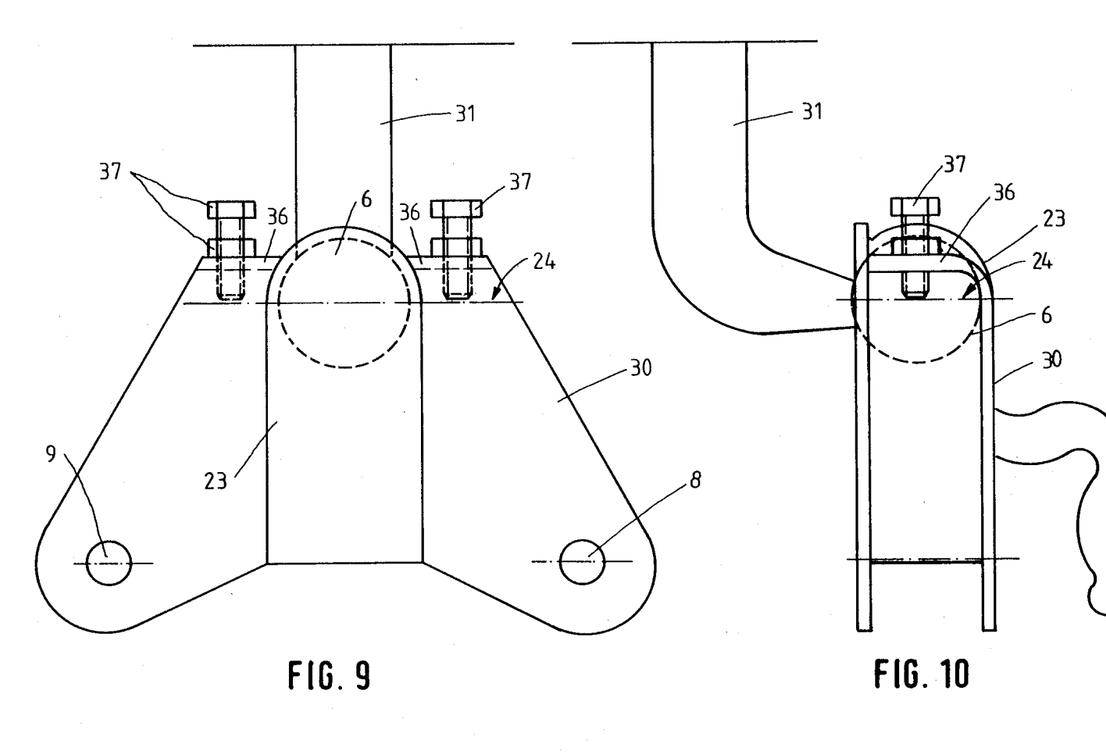
FIGS. 9 and 10 are plan and side views, respectively, of a supporting bridge connected to the trailer vehicle.

The bridge 30 illustrated in FIGS. 9 and 10 and connected to the trailer vehicle 4 has a front wall 36 opposite the tractor vehicle 1, in which connecting bolts 37 are adjustably and securably guided, whose front ends engage the bearing surface of the support 24. The connecting bars 12 and 13 (not shown in FIGS. 9 and 10) are coupled to the joints 8 and 9.

The support 24 is thus automatically formed when the bridge 30 with the coupling housing 23 (simply illustrated symbolically) is placed on the ball head of the ball-headed coupling part 6. It prevents a horizontal relative movement of the trailer vehicle and tractor vehicle about the swivel movement passing through the ball head of the ball-headed coupling part 6. The effective swivel movement takes place instead around the coupling point 14 (FIG. 3) lying closer to the centre of gravity 29, resulting from the point of intersection of the straight lines passing through the joints 8 and 9 and 10 and 11.

It is obvious that such supports 24 can also be realised in a structurally different way. The essential factor is that these supports 24 are intended to allow a so-called pitching movement of the tractor vehicle relative to the trailer vehicle in a vertical plane passing through the ball head of the ball-headed coupling part 6, whereupon, in this embodiment, the connecting bolts 37 act in the horizontal plane passing through the middle of the ball head.

Figure 11:
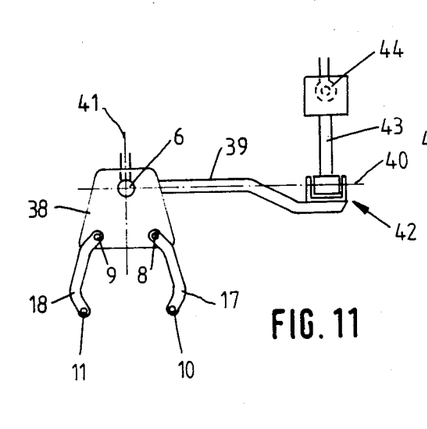
FIGS. 11 to 14 are plan and side views of two embodiments in which a support plate carrying the ball-headed coupling is supported in an articulated manner on the tractor vehicle by means of a side arm.
Figure 12:
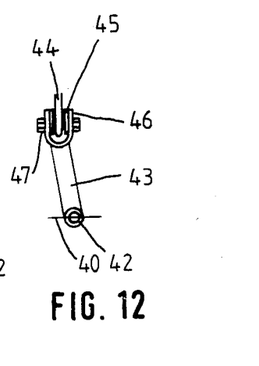

A support plate 38 is provided in the embodiment illustrated in FIGS. 11 and 12 and this support plate 38 carries a conventional coupling housing part by means of which the support plate 38 can be coupled to the ball-headed coupling part 6 of the tractor vehicle 1. This support plate 38 also contains the joints 8 and 9 opposite the tractor vehicle 1. The levers 17 and 18 may be in the form described with reference to the embodiments illustrated in FIGS. 4 to 6.

The support plate 36 has a laterally projecting side arm 39 rigidly secured thereto and this side arm 39 has a free end containing a joint 42 with a joint axis 40 extending horizontally and transversely to the longitudinal axis 41 of the tractor-trailer combination and also passing through the centre of the ball head of the ball-headed coupling part 6. The joint 42 is also formed by the eye of a lever 43 connected to a towing ring 44 secured in a conventional manner on the tractor vehicle 1. For this purpose, the example illustrated in FIG. 12 incorporates the provision of elastic inserts 45 on both sides of the towing ring 44 and surrounding said towing ring 44 by a forked arm 46 so that a suitable bolt 47 can be installed. The object of this is to retain the lever 43 so that the side arm 39 will of course permit a movement of the support plate 38 about the axis 40, but not a pivotal movement about the longitudinal axis 41 of the tractor-trailer combination.

Figure 13:
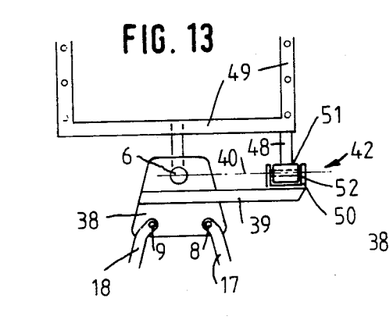
Figure 14:
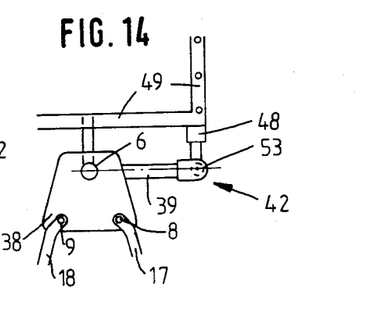

A similar construction is illustrated in FIGS. 13 and 14, according to which the side arm 39 of the support plate 38 forms a joint 42 between a shoulder portion 48 fixedly arranged on the frame 49 of the tractor vehicle 1. This joint 42 is formed for example by a fork 50 of the side arm 39, an eye 51 of the rigid shoulder portion 48, and a bearing journal 52, wherein in this case also the longitudinal axis of the bearing journal 52 passes through the centre of the ball head of the ball-headed coupling part 6. In the example illustrated in FIG. 14, the joint 42 is formed by a special ball-headed coupling 53, whose housing part is secured to the side arm 39 and is, together with the actuating lever and its ball joint, in fact a constituent of the rigid shoulder portion 48.

Figure 16:
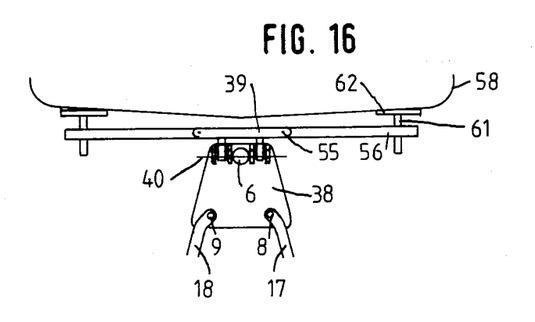
Figure 17:
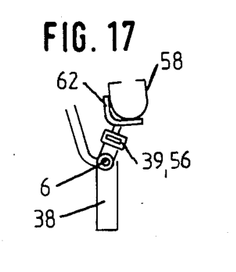

The hereinbefore mentioned variants illustrated in FIGS. 11 to 14 presuppose that structural parts are available on the tractor vehicle 1 on which the side arm 39 can be supported. In order however to make the coupling connection according to the invention universal and independent of the individual structural shape of the tractor vehicle 1, conception of the embodiments illustrated in FIGS. 16 to 18 start from the fact that the individual side arm 39 is mounted on the support plate 38 so as to be able to swivel about the joint axis 40 running horizontally through the ball head of the ball-headed coupling part 6. Clamping levers 56 are pivotally mounted, and in fact about vertical axes 55, at both ends of the side arm 39. In the example illustrated in FIG. 16, each individual clamping lever 56 has a spindle 61 which is supported by means of a strongly cushioned spindle plate 62 on the rear bumper 58 of the tractor vehicle 1. Since the ball-head of the ball-headed coupling part 6 is normally lower than the bumper 58, the result is an inclined arrangement of the side arm 39 and/or clamping lever 56. The vertical pivot axis 55 is intended to allow the spindle plate 22 to swivel in a suitable manner onto the bumper 58. If the spindle 61 is actuated, however, the joint 55 should then be locked.

Figure 15:
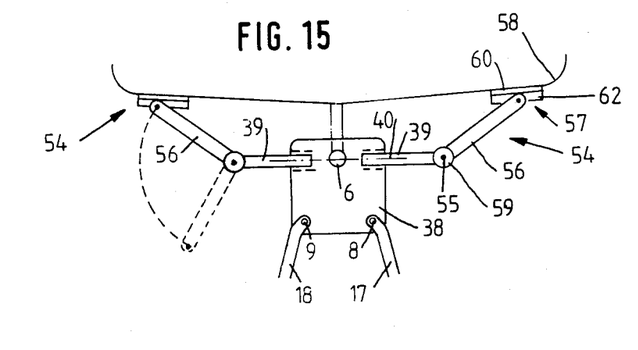
FIGS. 15 to 17 are plan and side views of two embodiments in which a side arm is rotatably mounted in a support plate.

FIG. 15 illustrates a variant according to which two side arms 39 with the support plate 38 are mounted so as to be able to rotate about the horizontal axis 40. The end of the side arm 39 again contains the joint with the vertical axis 55, which carries a clamping lever 56. A locking device 59, illustrated diagrammatically, may be formed for example as a tooth lock washer or friction disk and acts similar to a ratchet or exerts a clamping effect. It is important in this case also that the clamping lever 56 can be brought into the favourable position relative to the bumper 58, the free end 57 of the clamping lever 56 again being provided with a plate 62 with a soft cushion 60 which likewise can be mounted in a swivellable manner on the clamping lever 56.

The important feature in the hereinbefore mentioned embodiments is simply the fact that the clamping lever 56 and side arm 39 keep the support plate 38 in equilibrium and permit it to execute only a rotational movement about the horizontal axis 40.

Figure 18:
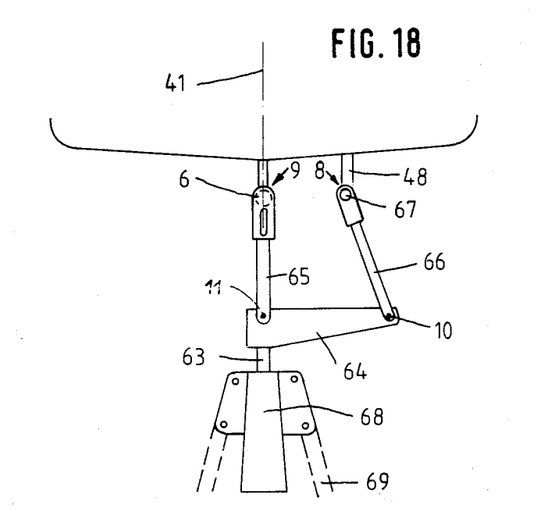
FIG. 18 is a plan view of an asymmetric four-joint arrangement with a side arm secured to a tow bar of the trailer vehicle.

Finally, FIG. 18 illustrates an asymmetric joint arrangement in which the tow bar 63 of the trailer vehicle 4, which is mounted in a longitudinally displaceable manner as usual in a forked drawbar housing 68, has a side arm 64 which extends on one side from the longitudinal axis 41 of the tractor-trailer combination and is rigidly connected to the tow bar 63. The forked drawbar housing 68 is provided in the usual manner with drawbar braces 69. The front end of the tow bar 63 accommodates a joint 11 to which is joined a main connecting bar 65 which carries the ball-headed coupling part 6 and, together with the normal towing coupling part of the tractor vehicle 1, forms the joint 9. In the forward movement direction, the main connecting bar 65 extends along the longitudinal axis 41 of the tractor vehicle 1. The free end of the side arm 64 is provided with the joint 10, from which starts an auxiliary connecting bar 66 which, together with a supporting element 67 and a corresponding counterpart of a stationary shoulder portion 48 of the tractor vehicle 1, forms the fourth joint 8. The supporting element 67 may again be formed as a ball-headed coupling.

This arrangement, described with reference to FIG. 18, also provides a satisfactory solution to the objective according to the invention which, moreover, has the advantage of being particularly simple. The tractive and compressive forces arising during braking and acceleration are almost exclusively absorbed during forward movement by the main connecting bar 65, whereas the auxiliary connecting bar 66 is basically additionally loaded if steering forces have to be transmitted, i.e. during curvilinear motion.

What we claim is:

1. A tractor-trailer combination which comprises:
   a tractor vehicle;
   a ball-headed coupling part fixed to said tractor vehicle and disposed rearwardly of a center of gravity thereof beyond the rear of said tractor vehicle;
   a trailer vehicle rearwardly of said tractor vehicle; and
   a hitch connecting said vehicles, said hitch comprising:
      a bridge member swivelably connected to said ball-headed coupling part;
      at least one outrigger arm extending horizontally from said bridge member and braced against said tractor vehicle at a location horizontally spaced from said ball-headed coupling part;
      a linkage including a pair of pivots connected with said trailer vehicle, a pair of pivots formed on said bridge member, and respective bars extending generally beteen the pivots of said pairs for articulating said trailer vehicle to said tractor vehicle through said hitch, said pivots and said bars being disposed such that an intersection of lines connecting the pivots linked by said bars lies forwardly of said ball-headed coupling part in the direction of said center of gravity; and
      hinge means defining the horizontal articulation substantially through said ball-headed coupling part in a direction perpendicular to a drive direction of the tractor-trailer combination for said hitch relative to said tractor vehicle.

2. The tractor-trailer combination defined in claim 1 wherein said hinge means comprises a pivot between said outrigger arm and said bridge member.

3. The tractor-trailer combination defined in claim 1 wherein said hinge means includes a pivot between a free end of said outrigger arm and said tractor vehicle.

4. The tractor-trailer combination defined in claim 3 wherein said outrigger arm is pivotally connected at its free end to a link articulated to said vehicle.

5. The tractor-trailer combination defined in claim 1 wherein said hinge means includes a ball and socket joint between a free end of said outrigger arm and said tractor vehicle.

6. The tractor-trailer combination defined in claim 1 wherein said bars are outwardly bowed.

7. The tractor-trailer combination defined in claim 1 wherein the pivots between said bars and said bridge member are ball and socket joints.

8. The tractor-trailer combination defined in claim 1 wherein a second bridge member connects the pivots of said bars at said trailer vehicle.

9. The tractor-trailer combination defined in claim 8, further comprising a horizontal pivot extending in said direction connecting said further bridge member with said trailer vehicle.

* * * * *